(12) United States Patent
Pirlo

(10) Patent No.: US 8,475,201 B2
(45) Date of Patent: Jul. 2, 2013

(54) INSULATION DISPLACEMENT CONNECTOR SYSTEM

(76) Inventor: Luca Pirlo, Brescia (IT)

( * ) Notice: Subject to any disclaimer, the term of this patent is extended or adjusted under 35 U.S.C. 154(b) by 0 days.

(21) Appl. No.: 13/257,330

(22) PCT Filed: Mar. 3, 2010

(86) PCT No.: PCT/IB2010/050920
§ 371 (c)(1),
(2), (4) Date: Sep. 19, 2011

(87) PCT Pub. No.: WO2010/109360
PCT Pub. Date: Sep. 30, 2010

(65) Prior Publication Data
US 2012/0021637 A1  Jan. 26, 2012

(30) Foreign Application Priority Data
Mar. 27, 2009  (IT) .............................. BS2009A0062

(51) Int. Cl.
H01R 4/24 (2006.01)
(52) U.S. Cl.
USPC ........................................ 439/395

(58) Field of Classification Search
USPC .................................. 439/395, 396
See application file for complete search history.

(56) References Cited

U.S. PATENT DOCUMENTS 4,749,365 A * 6/1988 Magnifico et al. ............ 439/396
6,908,331 B2  6/2005 Brown

FOREIGN PATENT DOCUMENTS

| DE | 3446105 A1 | 6/1986 |
| DE | 3830763 A1 | 3/1990 |
| EP | 0716607 A1 | 4/1986 |
| GB | 1586231 A | 3/1981 |

* cited by examiner

Primary Examiner — Gary F. Paumen
(74) Attorney, Agent, or Firm — Shoemaker and Mattare

(57) ABSTRACT

A mechanical insulation displacement connection system which creates an electrical connection between an enamel insulated wire and a terminal inserted in a special seat or pocket. The enamel insulated wire is wound at the beginning and end of the winding onto a central pin in the seat. The terminal is provided with two, sufficiently flexible inner tabs which, during insertion of the terminal in the seat, slide over the enamel insulated wire removing the enamel and permitting electrical contact with the copper wire. Once in position, the tabs press the wire against the central pin to ensure constant electrical contact over time.

12 Claims, 5 Drawing Sheets

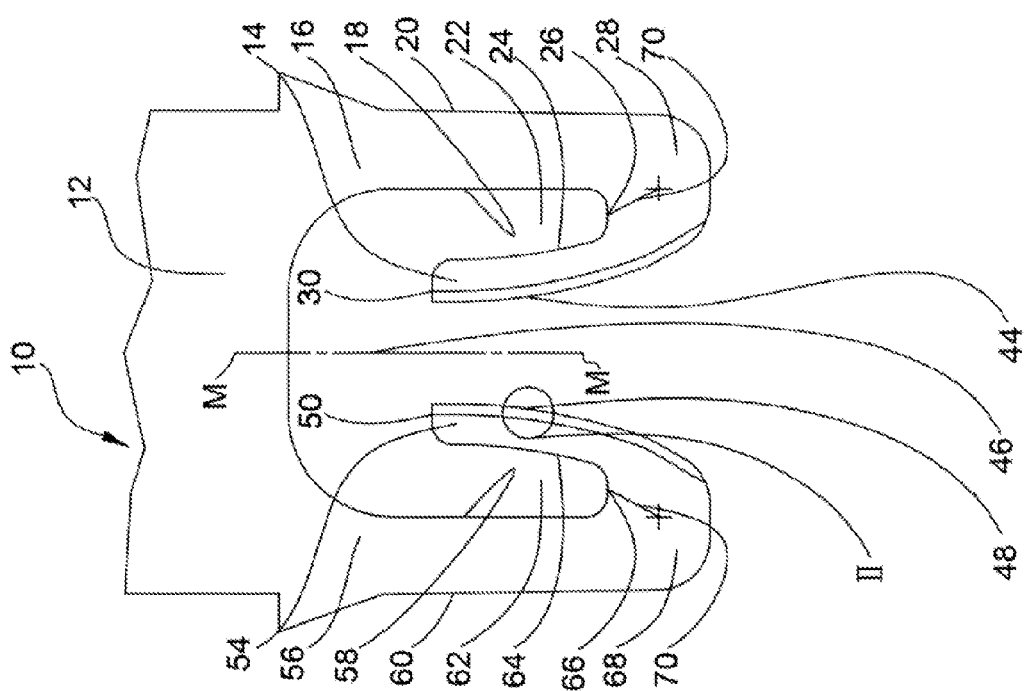
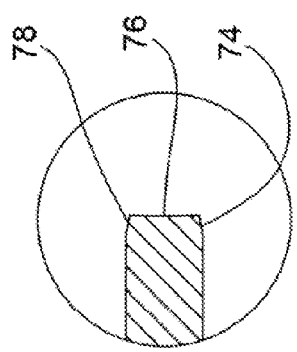

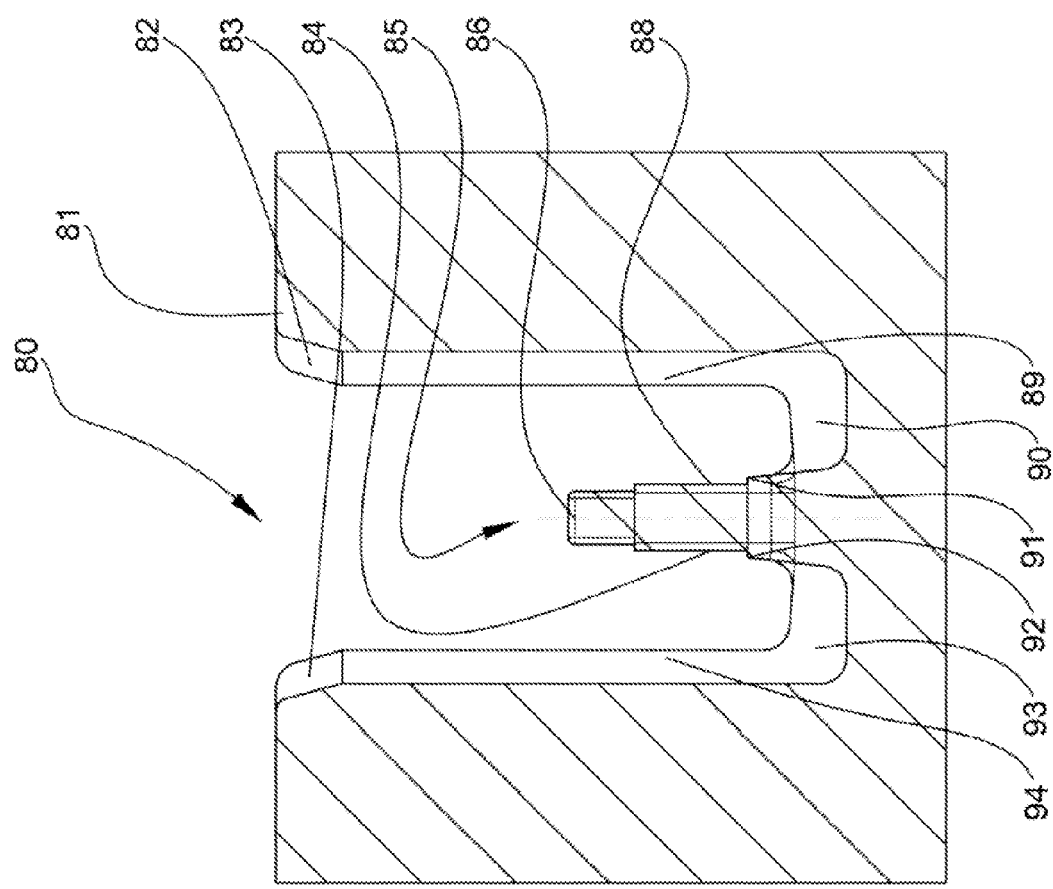

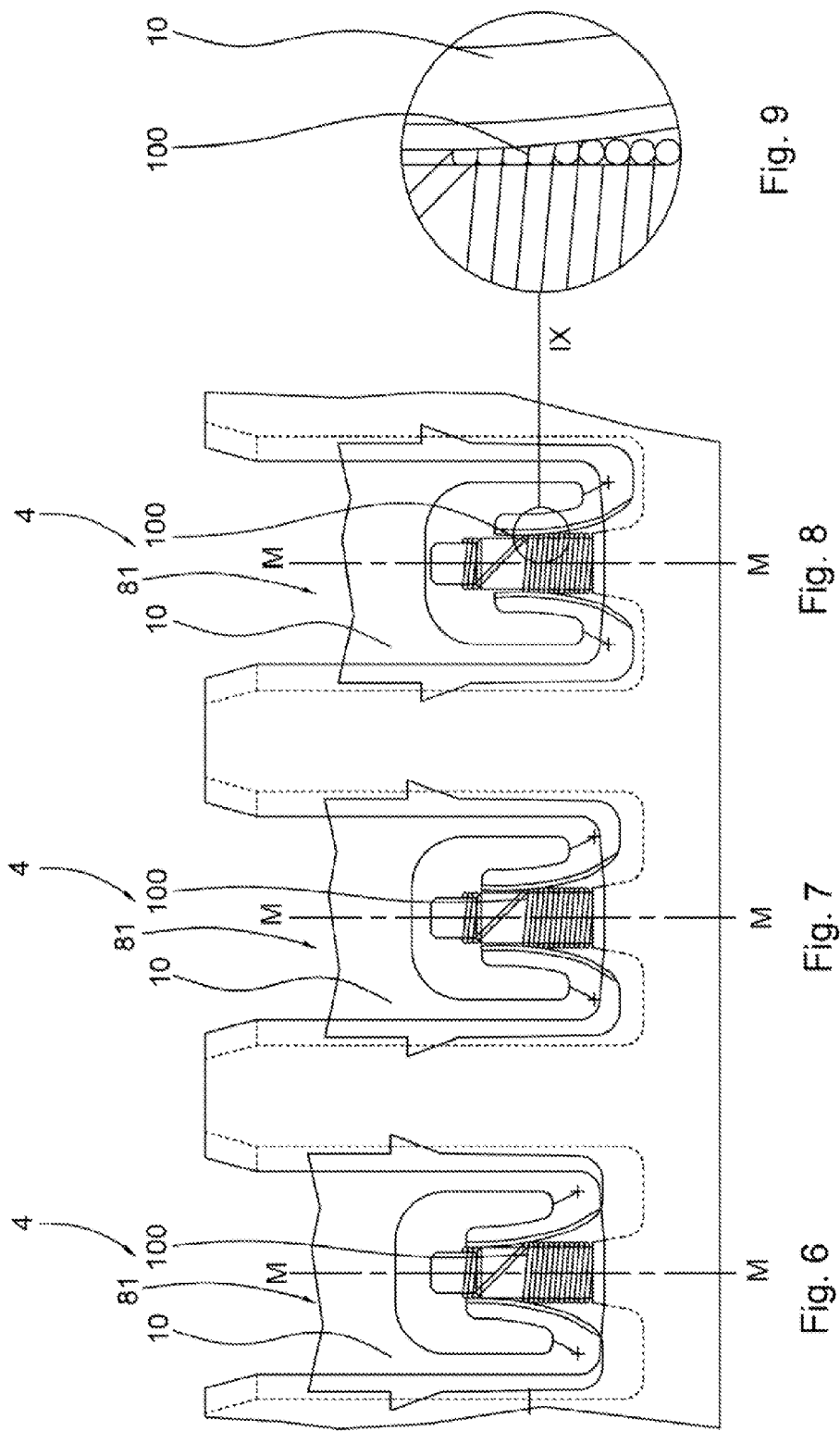

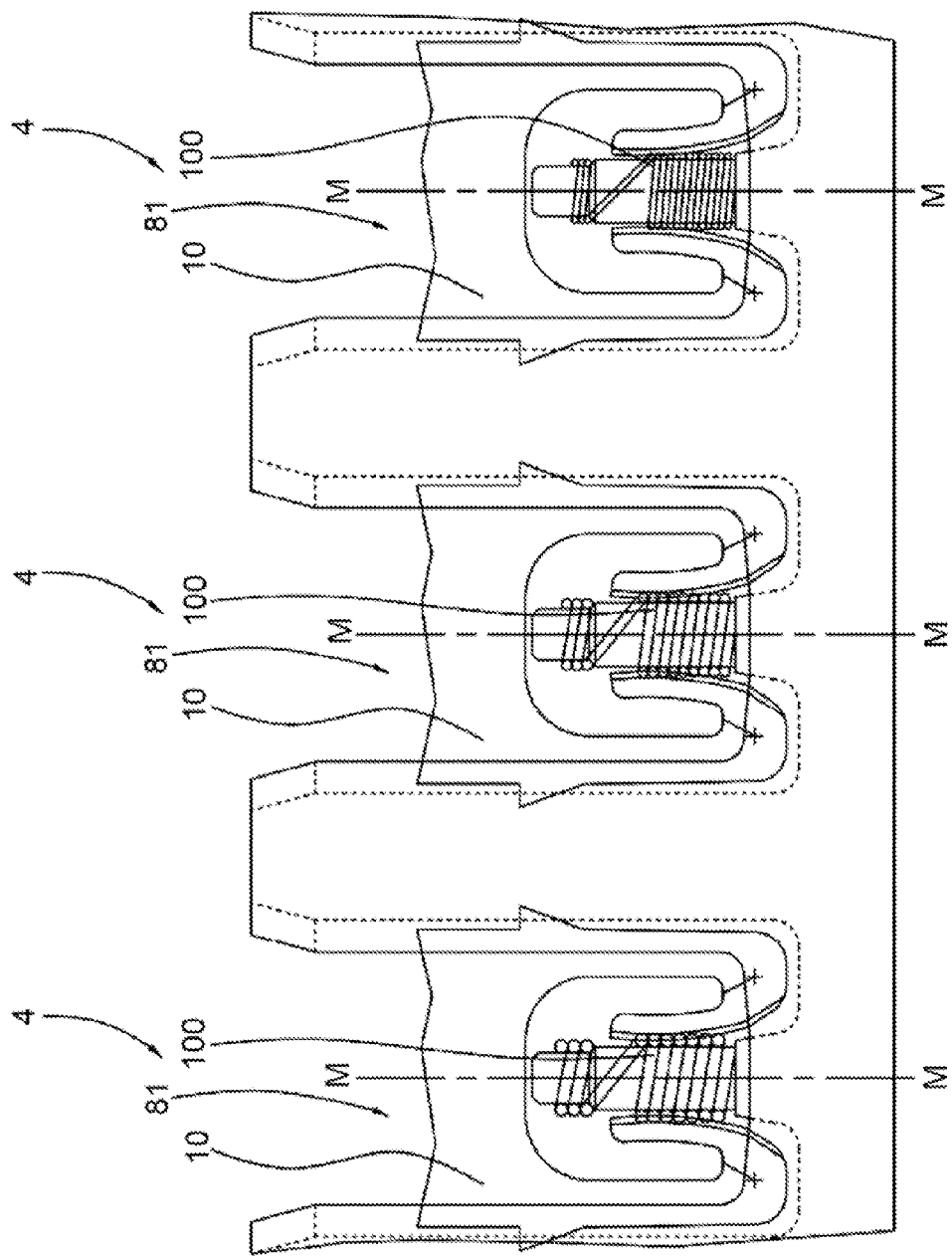

INSULATION DISPLACEMENT CONNECTOR SYSTEM

The present invention relates to a displacement connection system and, specifically, to a terminal with a mechanical IDC (Insulation Displacement Connector) type connection for fine enamel insulated wires called "capillaries".

Insulation Displacement Connectors "IDC"—are widely used in industry in all those sectors where an electric wire needs to be terminated/directly connected to a terminal.

Reference is made in particular to enamel insulated copper wires, in other words, coated in a layer of electric insulation, which must be removed from the tips of the wire to enable electrical contact with the relative terminal.

Displacement connections offer an electrical connection that is easy to use and apply while also making it possible to avoid stripping and subsequent welding of the enamel insulated wire.

In other words, the insulation displacement connection offers a valid alternative to the traditional welding and/or crimping systems since it makes it possible to contemporaneously strip the insulation layer and connect the wire mechanically and electrically.

The problem with the current displacement connection systems is that they all work on enamel insulated wire which is gripped by two terminal tabs. Such systems are described for example in U.S. Pat. Nos. 4,749,365 and 6,908,331.

The limitations of these terminals and applications lies in the diameter of the wire used and in the shape of the terminal.

In fact, in the prior solutions of the art the tabs of the terminal enter over the wire, accommodated in a special seat and for diameters below a certain size, the enamel insulated wire must be kept pressed (to enable use of the terminal and secure the position of the wire during insertion).

In DE3830763A1 the use of tabs extending substantially in a radial direction is described, obtained for example by shearing a tubular metallic element, which comprise blades which strip off the enamel during the insertion of the circular connector onto the enamel insulated wire. The resulting system is technically limited in that the shape of the collector is binding and in addition has very rigid tabs. The result is a limitation to the use of copper wire, related to a number of variables such as the shape and performance tolerance of the collector, the size and tolerance of the enamel insulated wire and of the relative enamel, as well as the performance tolerance of the central support of the wire and relative positioning of the wire.

Consequently the solutions listed above do not permit the use of very fine wires in that the force which the tabs exert on the wire must in any case be less than the resistance of the wire to cutting.

As of today therefore the main connection used for fine wires or "capillaries" is welding. A number of difficulties arise in the welding of capillary wires. In fact, welding modifies the technical characteristics of the enamel insulated wire at the point where welding is performed, and these modifications prove increasingly critical as the diameter of the enamel insulated wire used decreases.

For welding to be functional it must strip the enamel from the wire and make a stable contact between the wire and the terminal. To remove the enamel and make the contact the enamel insulated wire is heated until the enamel is removed/evaporated/melted or it is removed mechanically; in the former case it must be heated at the point where the connection is to be made, in the latter the material must be stripped from the outer diameter of the wire which is already fine, it can then be joined to the terminal with the help of liquid soldering or electric soldering or other techniques reliably joining the wire to the terminal.

In any case, at the point of welding the wire is annealed and therefore more fragile.

To make up for the decreased technical characteristics the wire is usually wound on itself so as not to break during welding and/or subsequently during functioning. In fact, during functioning, the winding may be subject to vibrations and/or temperature increases due to the current passing along it. Welding must, in addition, be carefully monitored particularly as regards temperature and performance times for the reasons given above, if the correct parameters are not observed the welding may not prove functional over time.

As a result, the need is felt for an insulation displacement connection which connects fine "capillary" wires without breaking them and which ensures a reliable electric "gas" connection of the wire and the terminal over time without being constrained by the wire's resistance to cutting during insertion of the terminal and which at the same time caters to the dimensional performance variables of the system components.

The purpose of the present invention is therefore to create an insulation displacement connection system which overcomes the limitations mentioned in relation to the prior art.

Such drawbacks and limitations are overcome by an insulation displacement connection system according to claim 1.

Other embodiments of the system according to the invention are described in the subsequent claims.

Further characteristics and advantages of the present invention will be more clearly comprehensible from the description given below, by way of non-limiting examples of its embodiments, wherein:

FIG. 1 shows a view of a terminal according to one embodiment of the present invention;

FIG. 2 shows a view of the enlarged detail II in FIG. 1;

FIG. 5 shows a section view of the pocket in FIG. 3, along the section plane V-V in FIG. 3;

FIGS. 6-8 show views of subsequent phases of insertion of a connection terminal in a respective pocket able to accommodate it;

FIG. 9 shows a section view of the enlarged detail IX in FIG. 8;

FIGS. 10-12 show section views of terminals inserted in respective pockets, using wires of increasingly smaller diameter.

The elements or parts of elements common to the embodiments described below will be indicated using the same reference numerals.

Figure 4:
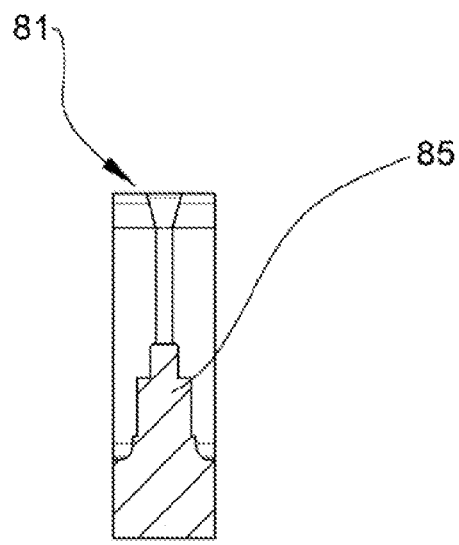
FIG. 4 shows a section view of the pocket in FIG. 3, along the section plane IV-IV in FIG. 3.

With reference to the aforesaid figures, reference numeral 4 globally denotes a displacement connection system comprising a terminal 10 and a pocket suitable to accommodate said terminal 10, as described further below.

The connection terminal 10 (FIG. 1) is composed of a body 12 and at least one outer tab 16,56; preferably, the terminal 10 comprises a first and a second outer tab 16 and 56 respectively, which extend from the body parallel and in a direction opposite to the terminal 10.

According to one embodiment, the terminal 10 comprises at least one inner tab 14, 54 and preferably comprises a first and a second inner tab 14 and 54 respectively which extends in the opposite direction to the former, towards the body 12.

The first outer tab 16 is joined to the first inner tab 14 in a first shared area 28. The second outer tab 56 is joined to the second inner tab 54 in a second shared area 68.

The first outer tab 16 has a first inner side 18 and a first outer side 20 opposite the first inner side 18. Similarly the second outer tab 56 has a second inner side 58 and a second outer side 60 opposite the second inner side 58.

According to one possible embodiment, at the first and second shared areas 28, 68 the terminal 10 comprises at least one cut 70. The cut 70 is made on the first inner side 18 and the second inner side 58. Said cut 70 increases the elasticity of the first and second inner tabs 14, 54 when they interfere with the associable enamel insulated wire 100. In a rest configuration, the cut 70 forms a separation of the material constituting the tabs so as to identify a sort of slit or meatus. During flexing of the tabs 14, 54 following interfacing with the enamel insulated wire 100, the inner tabs 14, 54 tend to bend back towards their respective inner sides 18, 58 so as to seal said slits. The elasticity of the tabs 14,54 is thereby increased on commencing contact with the enamel insulated copper wire while at the same time improving safety given that the slit or cut 70 reaches a limit position and cannot therefore open further. In other words, at the moment in which the slit closes again, after interacting with the enamel insulated wire 100, the slit cannot open further. If, however, the slit were positioned, for example, on the outer sides 20, 60 the flexing of the tabs 14, 54 could further widen the cut 70 until it caused excessive weakening of the tabs which could cause a loss of contact with the enamel insulated wire 100 and/or breaking of the tabs themselves. This phenomenon could, for example, occur in all those applications in which the connection system is subject to continuous vibrations, such as, for example, in the car industry.

The first inner tab 14 is composed of a first inner part 44 which ends in a first free end 30 and of a first outer part 24 opposite the first inner part 44.

The second inner tab 54 is composed of a second inner part 48 which ends in a second free end 50 and of a second outer part 64 opposite the second inner part 48.

Preferably, the inner tabs 14 and 54 have their respective inner parts 44 and 48 which are coined as seen in points 78 and 74. Advantageously, the inner parts 44,48 of the inner tabs 14,54 have, on the whole, a curved profile along their extension, for example in the shape of a parabolic curve being convex towards a centre line M-M of the terminal 10. In particular, the curved direction is such as to increase the reciprocal distance between the opposite inner tabs 14, 54, moving from their respective free ends 30, 50 towards the respective shared areas 28, 68.

According to one embodiment, the inner walls 44, of the inner tabs 14, 54 have, in relation to a cross-section perpendicular to the centre line plane M-M, a rectilinear wall 76 which interfaces directly with the enamel insulated wire (FIG. 2).

The function of coining the inner tabs 14, 54 is described below; the sheared material does not have a regular surface along the sheared walls while coining makes these walls uniform where material was removed during shearing, thereby producing as even a surface as possible.

On the whole, the inner tabs 14, 54 have a shape which facilitates insertion of the terminal 10 in its seat 81, strips the insulation from the enamel insulated wire 100 and maintains the connection over time by acting as a spring on the wire 100 and pressing against it.

According to one possible embodiment, the connection terminal 10 has a common sheared part 46 which separates the two inner tabs 14 and 54 from each other and from the body 12, a first sheared part 22 which separates the first inner tab 14 from the first outer tab 16 as far as a first connection portion 26 in the first shared area 28, and a second sheared part 62 which separates the second inner tab 54 from the second outer tab 56 as far as a second connection portion 66 in the second shared area 58.

Advantageously, the connection system 4 comprises the pocket 81 where the seat of the terminal 10 and of the enamel insulated winding wire 100 is made.

According to one embodiment, the pocket 81 comprises an upper guide 82, 83 for the insertion of the terminal 10, outer lateral guides 89 and 94 for the terminal 10, cavities 90 and 93 able to accommodate the first and the second shared areas 28, 68 of the terminal 10.

Advantageously, the pocket 81 comprises a central pin 85 defined by lower supports 91,92 for the enamel insulated wire 100 able to form a stop to the insertion of the enamel insulated wire 100 wound in a spiral around the central pin 85.

Advantageously, said central pin 85 is sized so as to ensure uniform support to the wire 100 wound coaxially to the pin itself. For example, the central pin 85 is quadrangular.

The central pin 85 is also defined by lateral walls 84 and 88 which support the enamel insulated wire 100 during winding of the same onto the central pin 85. Preferably, the lateral walls 84, 88 of the central pin 85 are counter-shaped to the rectilinear wall 76, in relation to a section plane perpendicular to the centre line plane M-M. According to one embodiment, said lateral walls 84, 88 are flat.

Preferably, the rectilinear wall 76 of the connection terminal 10 is counter-shaped to the lateral walls 84, 88 of the central pin 85. In other words, in relation to a section plane perpendicular to the centre line plane M-M, the wall 76 is flat and parallel to the associable centreline plane M-M, as well as towards the lateral walls 84, 88 of the central pin 85. Thanks to the fact that the wall 76 of the inner tabs 14, 54 is counter-shaped to the lateral walls 84, 88 of the central pin 85, and in conjunction with the curved shape of the inner tabs 44-48, the enamel insulated wire 100, is pressed against the central pin 85 in a gradual, progressive and uniform manner. This way it is possible to abrade the enamel coating without cutting the wire and thereby use an insulation displacement connection even on enamel insulated wires having a very small diameter.

FIG. 9 shows how the enamel is abraded and at least partially flattened by the tabs, preventing in any case shearing of the wire itself thanks to the special geometric conformation of the tabs combined with the shape of the central pin 85.

Figure 3:
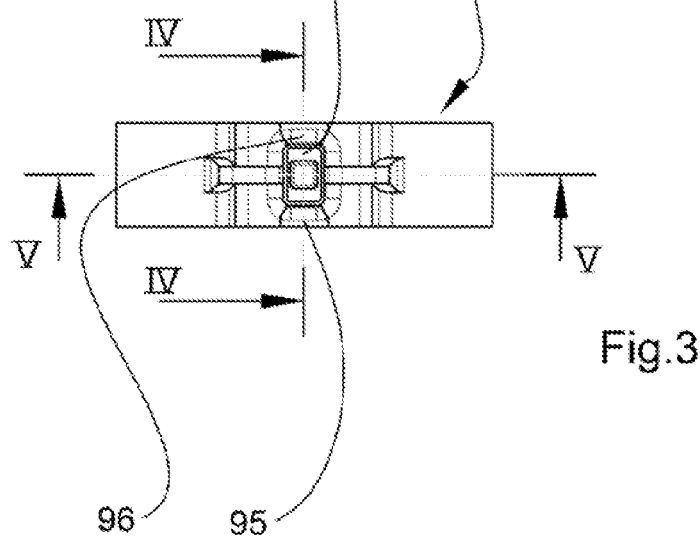
FIG. 3 shows a ground view of a pocket suitable for accommodating the terminal in FIG. 1.

The areas 95 and 96 (FIG. 3) enable the enamel insulated wire 100 not to protrude outside the pocket 81.

The central pin 85 comprises preferably an upper pin 86 on the central pin 85 which defines the position where the winding of the wire begins and/or ends.

Preferably, the upper pin 86 is of such a shape as to enable the enamel insulated wire 100 to remain in the position in which it is wound, preferably not cylindrical, preventing the wire, once cut, from unravelling as a result of its elasticity, but maintaining the form so achieved. For example, the upper pin 86 is a quadrangular shape in relation to a section plane perpendicular to the centreline plane M-M.

The upper pin 86 preferably has a smaller section than the lower pin 85, so as to facilitate the work of the inner tabs 14 and 54 of the terminal 10 during insertion as far as the working position.

The assembly and functioning of a connection system according to the invention will now be described.

The first operation is to wind the enamel insulated wire 100 onto the central pin 85 of the pocket 81; beginning from the upper pin 86 and winding the enamel insulated wire 100 from top to bottom on the lateral walls 84 and 88 as far as the lower supports 91 and 92; the direction of winding is unimportant.

Then the enamel insulated wire 100 is wound. When winding is completed, the enamel insulated wire 100 is wound in the pocket 81 of the connection on the central pin 85, starting from the lower supports 91 and from the bottom to the top and terminating on the upper pin 86 of the central pin 85.

The winding is now ready for connection of the terminal 10, where the electrical connection of the enamel insulated wire 100 of the winding and the terminal 10 and, specifically, of the inner walls 44 and 48 of the inner tabs 14 and 54, inside the pocket 81 will be mechanical.

The terminal 10 is positioned over the pocket 81, in the area 80; then the terminal 10 begins to enter the pocket 81 (FIG. 6).

The guides 82 and 83 help the terminal 10 to enter the pocket 81, while the outer lateral guides 89 and 94 of the pocket 81 guide the terminal 10 externally as far as the working position (FIG. 7).

When the inner tabs 14 and 54 of the terminal 10 encounter the enamel insulated wire 100 wound on the upper pin 86 of the central pin 85, these begin to slide over the enamel insulated wire 100 and to remove the enamel; the reaction of the central pin 85 and of the enamel insulated wire 100 makes the inner tabs 14 and 54 widen, pivoting on the connection portions 26 and 66.

The inner tabs 14, 54 work like a spring exerting an elastic thrust on the enamel insulated wire 100 against the central pin 85.

Advantageously, the inner walls 44,48 of the inner tabs 14 and 54 of the terminal 10 act so that once the terminal 10 reaches its final working position (FIG. 8), the enamel insulated wire 100 is cut into with a linear progression.

In fact, the enamel insulated wire 100, is elastically pressed by the inner walls 44, 48 of the inner tabs 14, 54 and supported by the lateral walls 84 and 88 of the central pin 85.

This allows the terminal 10 not to cut the enamel insulated wire 100, and thereby not to interrupt the transit of current, and also to have a wide area of contact for the transit of said electric current with a realistic "gas" seal.

The central pin 85 therefore acts as a column which has a dual function of providing the enamel insulated wire 100 with a seat to position itself on and providing a support to the wire 100 when the terminal 10 is inserted above.

Advantageously, the wire 100 is not pressed to cut from top to bottom but in an inclined/oblique manner; the coils on the winding facilitate the previous coils, furthermore the inclination of the inner tabs 14,54 facilitates processing of the wire 100 by rubbing/sliding.

The inner tabs 14,54 are elastic and therefore tend to widen/open, helped furthermore by the central pin 85 which increases the reaction of the enamel insulated wire 100, which is wound on it, against the terminal 10.

The force exerted by the inner tabs 14,54 on the enamel insulated wire 100 is thus divided into two or more parts; each side of the enamel insulated wire 100 on the pin 10 reacts with a single tab and is helped, in addition, by the support of the central pin 85 of the seat where the enamel insulated wire 100 is wound in a spiral.

In addition, during its insertion phase the terminal 10 always encounters a different coil of enamel insulated wire 100 wound on the pin 85 and this reacts in turn as with the previous coils of the enamel insulated wire 100.

In addition, thanks to the inclined shape of the inner tabs 14, 54 of the terminal 10, the higher up coils are pressed more while those at the foot of the pin 85 are not even touched.

As may be seen from FIGS. 9-11, thanks to the progressive shaping of the inner tabs 14, 54, the wire is progressively pressed. Depending on the diameter of the wire, this may be constrained against the central pin 85 or may be thrust against the central pin 85 by the tabs themselves, before being abraded or cut into by them. In any case, the continuity of the electric contact between the wire 100 and the terminal 10 is guaranteed.

This means that during the insertion of the terminal 10 onto the enamel insulated wire 100 and onto the central pin 85, in no case is there an interruption of the transit of current between the enamel insulated wire 100 and the terminal 10 as a result of the force exerted by the inner tabs 14, 54 on the wire 100.

The constant force created by the terminal 10 on the wire/pin combination 100, 85 allows a constant pressure on the wire 100 to be maintained.

The result is a reliable electrical connection between the terminal 10 and the wire 100 with a "gas" seal, secure against vibrations and the thermic dilations which the connection system 4 may undergo during use and which cause the expansion and contraction of the wire 100.

As may be appreciated from the description, the system according to the invention makes it possible to overcome the limitations presented in relation to the prior technique.

In particular, the present invention makes it possible to use an insulation displacement system on enamel insulated wires having a 'capillary' diameter.

It is thereby possible to avoid both crimping and welding, overcoming the technical difficulties which these types of connections entail.

The terminal cuts into the wire wound in a spiral on the support pin in an even, controlled manner, as well as guaranteeing dual left and right contacts with the respective inner tabs.

The wire is pressed against the central winding pin and enables a realistic "gas" electrical connection combined with ease of use regardless of the diameter of the wire used.

The system of the present invention makes it possible to guarantee the connection between the terminal and the enamel insulated wire over a wide area and in a simple, constant manner.

A person skilled in the art, in order to satisfy contingent and specific requirements, may make numerous modifications and variations to the connection systems described above while remaining within the sphere of protection defined by the following claims.

The invention claimed is:

1. An insulation displacement connection system, comprising
   a connection terminal equipped with at least one inner tab,
   a pocket able to accommodate said connection terminal,
   a wire wound in a spiral and lodged at least partially in said pocket,
   wherein the pocket comprises at least one central pin which said wire is wound and inserted on,
   the at least one inner tab being shaped to elastically intercept the central pin, so as to exert an abrasive effect on the wire during the insertion of the connection terminal in the pocket and to elastically influence the wire against the central pin following the insertion of said terminal in the pocket, ensuring electrical connection between the at least one tab and the wire, wherein
   the central pin is defined by lateral walls which support the enamel insulated wire during winding of the same onto the central pin, the central pin comprising a centre line plane,
   the inner tabs have respectively inner walls suitable to intercept the wire, said inner walls having, in relation to a cross-section perpendicular to the centre line plane, a rectilinear wall which interfaces directly with the enamel insulated wire, and the lateral walls of the central pin being counter-shaped to the rectilinear wall of the inner walls so as to abrade the enamel coating of the wire in a gradual and progressive manner.

2. A connection system according to claim 1, wherein the inner parts of the inner tabs have, on the whole, a curved profile along their extension being convex towards the centre line of the terminal.

3. A connection system according to claim 2, wherein the inner parts of the inner tabs have a curved profile in the shape of a parabolic curve.

4. A connection system according to claim 3, wherein the curved direction is such as to increase the reciprocal distance between the opposite inner tabs, moving from respective free ends of the inner tabs towards respective connection portions.

5. A connection system according to claim 1, wherein the connection terminal has a common sheared part which separates the two inner tabs from each other and from a body, a first sheared part which separates the first inner tab from a first outer tab as far as a first connection portion, and a second sheared part which separates the second inner tab from a second outer tab as far as a second connection portion, wherein the inner tabs flex elastically pivoting on said connection portions.

6. A connection system according claim 5, wherein at said first and second connection portions, the terminal comprises at least one cut, on the first inner side and the second inner side of the outer tabs.

7. A connection system according to claim 1, wherein said central pin is quadrangular, having lateral walls flat and counter-shaped to the rectilinear walls of the inner parts, so as to ensure uniform support of the wire wound coaxially to the pin itself during the insertion of the terminal.

8. A connection system according to claim 1, wherein the central pin comprises an upper pin which defines the position where the winding of the wire begins and/or ends.

9. A connection system according to claim 1, wherein the central pin comprises an upper pin which is of such a shape as to enable the enamel insulated wire to remain in the position in which it is wound.

10. A connection system according to claim 9, wherein the upper pin is a quadrangular shape in relation to a section plane perpendicular to the centreline plane.

11. A connection system according to claim 9, wherein the upper pin has a smaller section than the central pin, so as to facilitate the work of the inner tabs of the terminal during insertion as far as the working position.

12. A connection system according to claim 1, wherein the central pin is defined by lower supports for the enamel insulated wire able to form a stop to the insertion of the enamel insulated wire wound in a spiral around the central pin.

* * * * *